UNITED STATES PATENT OFFICE.

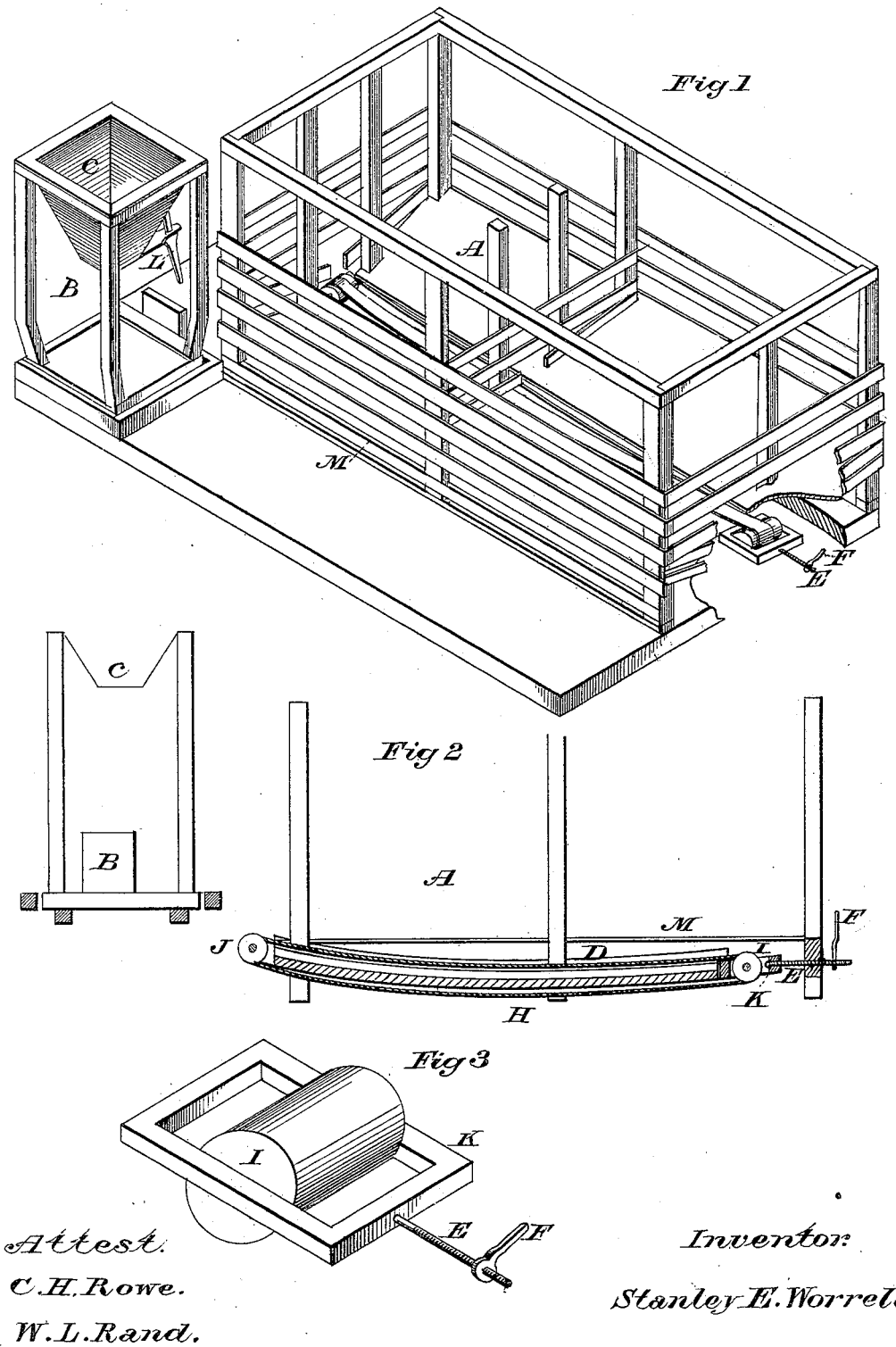

STANLEY E. WORRELL, OF HANNIBAL, MISSOURI.

IMPROVEMENT IN METHODS OF HANDLING GRAIN.

Specification forming part of Letters Patent No. 205,778, dated July 9, 1878; application filed March 18, 1878.

*To all whom it may concern:*

Be it known that I, STANLEY E. WORRELL, of the city of Hannibal, county of Marion, State of Missouri, have invented a new and useful Improvement in the Manner of Handling Corn or other Grain, of which the following is a specification:

The invention relates to grain cribs or bins and manner of emptying them, and scales for weighing into and out of same.

Heretofore such cribs or bins have generally been constructed with flat bottoms, or else slanted from end to end toward one side or the center; and when a drag-belt has been used it has been run in a straight trough, which causes great strain on belt and the machine in connection, and the pulleys for same have been rigidly secured, which necessitates a stoppage of the machinery and much delay whenever the drag-belt stretches, which frequently occurs.

In the present invention the bottom of the crib or bin is constructed in a concave manner, or with a belly made to suit the natural sag of the drag-belt, consequently does not have to carry its own weight on the bottom of the trough, but just the weight of the grain being conveyed, thereby greatly reducing the labor of said belt and machinery for driving same.

For weighing in the grain from wagons or other conveyances, the common platform-scales are employed; but when the corn or grain is weighed out into cars or other means of transportation, the grain is elevated, after being carried out by the drag-belt into an elevated hopper, supported by legs, upon the said platform-scales, when it is weighed, then spouted by gravitation into wagons, cars, boats, or other conveyances, thereby doing away with a pair of hopper-scales.

In the accompanying drawing, in which similar letters of reference indicate like parts, Figure 1 is a perspective of my improvement or invention. Fig. 2 is a vertical longitudinal section of same, and Fig. 3 a detail view of appliance for tightening drag-belt.

In the crib or bin A, M is the outside line of the floor; D, the trough in which runs the drag-belt H; E, the bolt secured to the frame K, in which is secured the pulley I, around which the drag-belt passes. The slack is taken out of this belt by the end-gate nut F.

B is a set of platform-scales, upon which is supported the hopper C. L is the lever for opening gate to empty same.

The operation of the device is as follows: The grain is weighed on scales B and thrown into the bin A. Then the grain in bin A is dropped on the drag-belt H, when it is carried over the pulley J to the sheller, cleaner, or elevator. After it is discharged into hopper C, on scales B, and weighed, the gate is opened by the lever L, and it is spouted whenever wanted.

What I claim is—

1. The combination of the bin-bottom with the drag-belt and trough, substantially as described.

2. The combination of the weighing-hopper, supported by legs on the scales, with lever and gate, as set forth.

3. In combination with the bin-bottom M, the sagged drag-belt H and trough D, with the hopper C, with gate and lever L, on scales B, substantially as described.

STANLEY E. WORRELL.

Witnesses:
   CHAS. H. ROWE,
   W. L. RAND.